(12) United States Patent
He et al.

(10) Patent No.: US 12,163,016 B2
(45) Date of Patent: Dec. 10, 2024

(54) CROSSLINKED POLYMERIC COMPOSITION AND COATED CONDUCTOR

(71) Applicant: Dow Global Technologies LLC, Midland, MI (US)

(72) Inventors: Chao He, Shanghai (CN); Wenke Miao, Shanghai (CN); Xianmin Xu, Shanghai (CN); Mohamed Esseghir, Lawrenceville, NJ (US); Xiaoxing Miao, Shanghai (CN); Hongyu Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 311 days.

(21) Appl. No.: 17/611,710

(22) PCT Filed: May 24, 2019

(86) PCT No.: PCT/CN2019/088291
§ 371 (c)(1),
(2) Date: Nov. 16, 2021

(87) PCT Pub. No.: WO2020/237416
PCT Pub. Date: Dec. 3, 2020

(65) Prior Publication Data
US 2022/0227979 A1    Jul. 21, 2022

(51) Int. Cl.
*C08K 7/28* (2006.01)
*C08L 23/08* (2006.01)

(52) U.S. Cl.
CPC ............ *C08L 23/0892* (2013.01); *C08K 7/28* (2013.01); *C08K 2201/005* (2013.01); *C08L 2203/206* (2013.01); *C08L 2312/00* (2013.01)

(58) Field of Classification Search
CPC .......... C08L 23/0892; C08L 2203/206; C08L 2312/00; C08L 51/06; C08K 7/24; C08K 7/28; C08K 2201/005
USPC ................ 174/110 R, 118, 110 SR, 110 PM; 428/384
See application file for complete search history.

(56) References Cited

U.S. PATENT DOCUMENTS

| | | |
|---|---|---|
| 3,225,018 A | 12/1965 | Zutty |
| 4,110,554 A | 8/1978 | Moore et al. |
| 4,426,230 A | 1/1984 | Davis et al. |
| 4,574,133 A | 3/1986 | Umpleby |
| 5,677,383 A | 10/1997 | Chum et al. |
| 6,111,023 A | 8/2000 | Chum et al. |
| 6,984,695 B2 | 1/2006 | Brown et al. |
| 9,321,906 B2 | 4/2016 | Takeishi et al. |
| 9,595,365 B2 | 3/2017 | Esseghir et al. |

(Continued)

FOREIGN PATENT DOCUMENTS

CN        107987367 A        5/2018

*Primary Examiner* — Matthew D Matzek
(74) *Attorney, Agent, or Firm* — Boyle Fredrickson, S.C.

(57) ABSTRACT

The present disclosure provides a crosslinked polymeric composition. The crosslinked polymeric composition contains (A) a silane functionalized ethylene-based polymer and (B) inorganic hollow microspheres having (i) a $D_{90}$ particle size from 10 μm to 100 μm, (ii) a crush strength from 17 MPa to 140 MPa, and (iii) a density from 0.10 g/cc to 0.40 g/cc. The crosslinked polymeric composition has a tensile strength from 11 MPa to 40 MPa and a tensile elongation from 12% to 100%.

11 Claims, 1 Drawing Sheet

(56) References Cited

U.S. PATENT DOCUMENTS

| | | | |
|---|---|---|---|
| 2005/0137290 A1* | 6/2005 | Hagen | C08L 53/02 |
| | | | 524/487 |
| 2007/0155858 A1 | 7/2007 | Israelson | |
| 2009/0145627 A1* | 6/2009 | Frigerio | H01B 13/142 |
| | | | 264/45.9 |
| 2014/0088244 A1* | 3/2014 | Takeishi | C08L 23/10 |
| | | | 524/584 |
| 2015/0200038 A1 | 7/2015 | Esseghir et al. | |
| 2020/0152347 A1 | 5/2020 | Zhang et al. | |

* cited by examiner

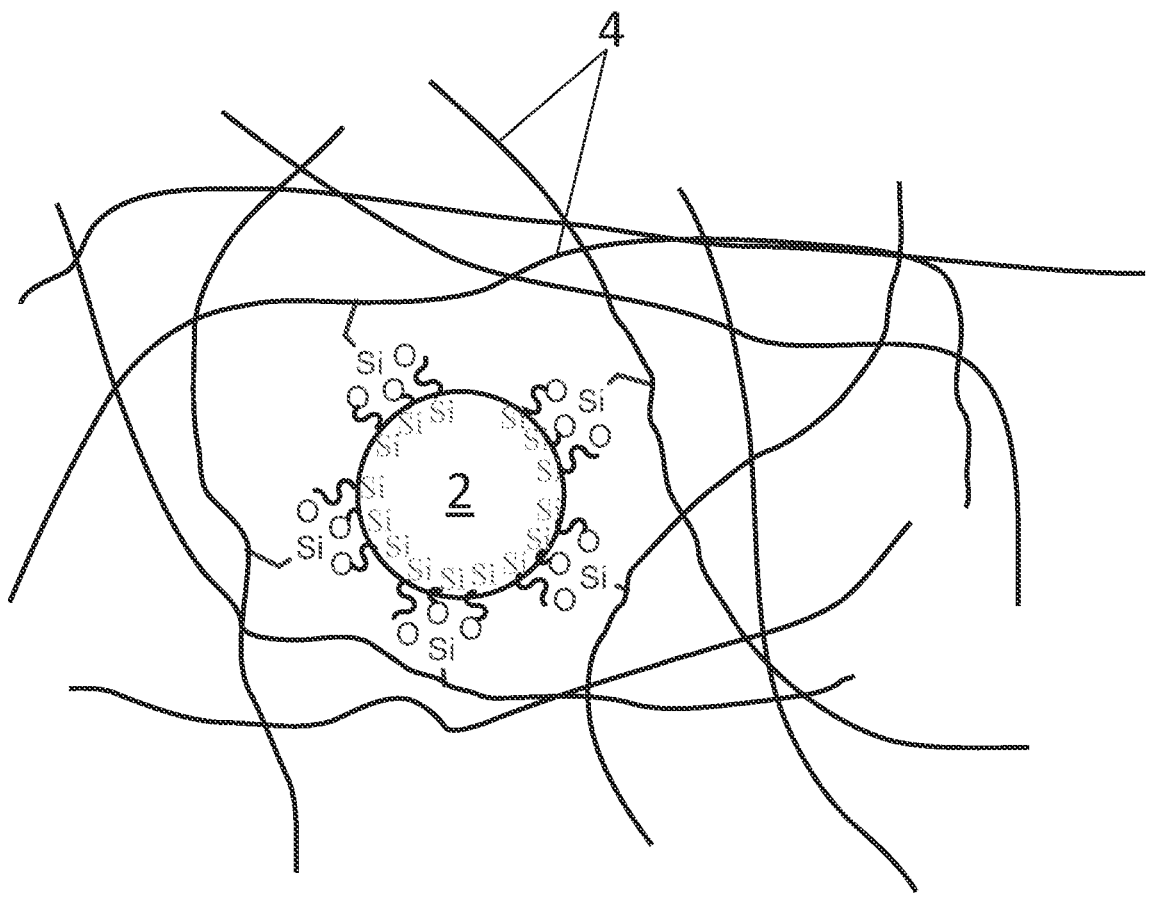

CROSSLINKED POLYMERIC COMPOSITION AND COATED CONDUCTOR

BACKGROUND

Communication cables are frequently formed by coating a conductor with an insulation material containing a polyolefin. To improve the dielectric performance of the polyolefin, the polyolefin is often foamed using a chemical blowing agent or a physical blowing agent. However, foaming is known to reduce the tensile strength of the insulation material. Additionally, the uniformity and size of the foam cells is difficult to control, particularly in small cables such as small form-factor pluggable (SFP) cables.

The art recognizes the need for a coating composition, and further an insulation material, containing a polyolefin that exhibits the combination of dielectric performance and mechanical performance (e.g., tensile strength) suitable for wire and cable applications.

SUMMARY

The present disclosure provides a crosslinked polymeric composition. The crosslinked polymeric composition contains (A) a silane functionalized ethylene-based polymer and (B) inorganic hollow microspheres having (i) a $D_{90}$ particle size from 10 μm to 100 μm, (ii) a crush strength from 17 MPa to 140 MPa, and (iii) a density from 0.10 g/cc to 0.40 g/cc. The crosslinked polymeric composition has a tensile strength from 11 MPa to 40 MPa and a tensile elongation from 12% to 100%.

The present disclosure also provides a coated conductor. The coated conductor includes a conductor and a coating on the conductor, the coating including a crosslinked polymeric composition. The crosslinked polymeric composition contains (A) a silane functionalized ethylene-based polymer and (B) inorganic hollow microspheres having (i) a $D_{90}$ particle size from 10 μm to 100 μm, (ii) a crush strength from 17 MPa to 140 MPa, and (iii) a density from 0.10 g/cc to 0.40 g/cc. The crosslinked polymeric composition has a tensile strength from 11 MPa to 40 MPa and a tensile elongation from 12% to 100%.

BRIEF DESCRIPTION OF THE DRAWINGS

FIG. 1 is a schematic representation of a crosslinked polymeric composition in accordance with an embodiment of the present disclosure.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

"Alkoxy" (or "alkoxy group") refers to the —$OZ^1$ radical, where representative $Z^1$ include alkyl, substituted alkyl, cycloalkyl, substituted cycloalkyl, heterocycloalkyl, substituted heterocycloalkyl, silyl groups and combinations thereof. Nonlimiting examples of suitable alkoxy radicals include methoxy, ethoxy, benzyloxy, and t-butoxy.

"Alkyl" and "alkyl group" refer to a saturated linear, cyclic, or branched hydrocarbon group.

"Alkenyl" or "alkenyl group" refer to a hydrocarbyl group containing at least one C═C double bond. Alkenyl groups may be linear, cyclic or branched. Nonlimiting examples of suitable alkenyl groups include ethenyl groups, n-propenyl groups, i-propenyl groups, n-butenyl groups, t-butenyl groups, i-butenyl groups, etc.

"Aryl" and "aryl group" refer to an organic radical derived from aromatic hydrocarbon by deleting one hydrogen atom therefrom. An aryl group may be a monocyclic and/or fused ring system, each ring of which suitably contains from 5 to 7, preferably from 5 or 6 atoms. Structures wherein two or more aryl groups are combined through single bond(s) are also included. Specific examples include, but are not limited to, phenyl, tolyl, naphthyl, biphenyl, anthryl, indenyl, fluorenyl, benzofluorenyl, phenanthryl, triphenylenyl, pyrenyl, perylenyl, chrysenyl, naphtacenyl, fluoranthenyl and the like.

"Alpha-olefin," "α-olefin" and like terms refer to a hydrocarbon molecule or a substituted hydrocarbon molecule (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 2 carbon atoms, or 3 to 20 carbon atoms, or 4 to 10 carbon atoms, or 4 to 8 carbon atoms. Nonlimiting examples of α-olefins include ethylene, propylene, 1-butene, 1-pentene, 1-hexene, 1-octene, 1-dodecene, and mixtures of two or more of these monomers.

"Blend," "polymer blend" and like terms refer to a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property.

A "cable" is at least one conductor, e.g., wire, optical fiber, etc., within a protective insulation, jacket, sheath. A cable may be two or more wires or two or more optical fibers bound together in a common protective jacket or sheath. Combination cables may contain both electrical wires and optical fibers. The individual wires or fibers inside the jacket or sheath may be bare, covered or insulated. The cable can be designed for low, medium, and/or high voltage applications.

"Carboxylate" refers to a salt or ester of carboxylic acid. "Carboxylic acid" is an organic acid containing a carboxyl group (—COOH).

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "conductor" is one or more wire(s), or one or more fiber(s), for conducting heat, light, and/or electricity at any voltage (DC, AC, or transient). The conductor may be a single-wire/fiber or a multi-wire/fiber and may be in strand form or in tubular form. Non-limiting examples of suitable conductors include carbon and various metals, such as silver, gold, copper, and aluminum. The conductor may also be optical fiber made from either glass or plastic. The conductor may or may not be disposed in a protective sheath. The conductor may be a single cable or a plurality of cables bound together (i.e., a cable core, or a core).

"Crosslinkable" and "curable" indicate that the polymer, before or after shaped into an article, is not cured or crosslinked and has not been subjected or exposed to treatment that has induced substantial crosslinking although the polymer comprises additive(s) or functionality that will effectuate substantial crosslinking upon subjection or exposure to such treatment (e.g., exposure to water).

"Crosslinked" and similar terms indicate that the polymer composition, before or after it is shaped into an article, has xylene or decalin extractables of less than or equal to 90 weight percent (i.e., greater than or equal to 10 weight percent gel content).

"Cured" and similar terms indicate that the polymer, before or after it is shaped into an article, was subjected or exposed to a treatment which induced crosslinking.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE), medium density polyethylene (MDPE), and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. In an embodiment, the ethylene-based polymer does not contain an aromatic comonomer polymerized therein.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins, ELITE™ Enhanced Polyethylene Resins, and CONTINUUM™ Bimodal Polyethylene Resins, each available from The Dow Chemical Company; LUPOLEN™, available from LyondellBasell; and HDPE products from Borealis, Ineos, and ExxonMobil.

The terms "hydrocarbyl" and "hydrocarbon" refer to substituents containing only hydrogen and carbon atoms, including branched or unbranched, saturated or unsaturated, cyclic, polycyclic or noncyclic species. Nonlimiting examples include alkyl-, cycloalkyl-, alkenyl-, alkadienyl-, cycloalkenyl-, cycloalkadienyl-, aryl-, and alkynyl-groups.

A "hydrolysable silane group" is a silane group that will react with water. These include alkoxysilane groups on monomers or polymers that can hydrolyze to yield silanol groups, which in turn can condense to crosslink the monomers or polymers.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

A "jacket" is an outermost coating on the conductor. When the conductor includes a single coating, the coating may serve as both a jacket and an insulation on the conductor.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLIN™ linear low density polyethylene resins and DOWLEX™ polyethylene resins, each available from the Dow Chemical Company; and MARLEX™ polyethylene (available from Chevron Phillips).

"Low density polyethylene" (or "LDPE") consists of ethylene homopolymer, or ethylene/α-olefin copolymer comprising at least one $C_3$-$C_{10}$ α-olefin, preferably $C_3$-$C_4$ that has a density from 0.915 g/cc to 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Medium density polyethylene" (or "MDPE") is an ethylene homopolymer, or an ethylene/α-olefin copolymer comprising at least one $C_3$-$C_{10}$ α-olefin, or a $C_3$-4α-olefin, that has a density from 0.926 g/cc to 0.940 g/cc.

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include EUTE™ enhanced polyethylene and ELITE AT™ advanced technology resins, each available from The Dow Chemical Company; SURPASS™ Polyethylene (PE) Resins, available from Nova Chemicals; and SMART™, available from SK Chemicals Co.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. A nonlimiting example of a propylene-based polymer (polypropylene) is a propylene/α-olefin copolymer with at least one $C_2$ or $C_4$-$C_{10}$ α-olefin comonomer.

A "sheath" is a generic term and when used in relation to cables, it includes insulation coverings or layers, protective jackets and the like.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ULDPE resins and FLEXOMER™ VLDPE resins, each available from The Dow Chemical Company.

A "wire" is a single strand of conductive metal, e.g., copper or aluminum, or a single strand of optical fiber.

Test Methods

Crush strength is measured in accordance with ASTM D3102-72. The result is recorded in mega Pascal (MPa).

$D_{10}$, $D_{50}$, and $D_{90}$ particle size is measured using a Laser Particle Size Analyzer. $D_{10}$ particle size is the particle diameter at which 10% of the microsphere's mass is composed of particles with a diameter less than this value. $D_{50}$ particle size is the particle diameter at which 50% of the microsphere's mass is composed of particles with a diameter less than this value and 50% of the microsphere's mass is composed of particles with a diameter greater than said value. $D_{90}$ particle size is the particle diameter at which 90% of the microsphere's mass is composed of particles with a diameter less than this value.

Density is measured in accordance with ASTM D792, Method B. The result is recorded in grams (g) per cubic centimeter (g/cc or g/cm³).

Dielectric constant (DC) is measured in accordance with ASTM D1531, at 1 gigahertz (GHz). Tests are conducted on 100 mm×100 mm×1 mm plaques prepared as described below in the examples section.

Gel content is measured by extraction in boiling decalin at 180° C. for 5 hours according to ASTM 2765. The result is recorded in percent (%), based on the total weight of the composition. The percent gel normally increases with increasing crosslinking levels.

Melt index (MI) (also known as $I_2$) is measured in accordance with ASTM D1238, Condition 190° C./2.16 kilogram (kg) weight and is reported in grams eluted per 10 minutes (g/10 min).

Tensile strength and tensile elongation are measured in accordance with ASTM D638. Tests are conducted on 100 mm×100 mm×1 mm plaques prepared as described below in the examples section. Tensile strength is recorded in mega-Pascals (MPa). Tensile elongation is recorded as a percentage.

DETAILED DESCRIPTION

The present disclosure provides a crosslinked polymeric composition. The crosslinked polymeric composition contains (A) a silane functionalized ethylene-based polymer and (B) inorganic hollow microspheres having (i) a $D_{90}$ particle size from 10 μm to 100 μm, (ii) a crush strength from 17 MPa to 140 MPa, and (iii) a density from 0.10 g/cc to 0.40 g/cc. The crosslinked polymeric composition has a tensile strength from 11 MPa to 40 MPa and a tensile elongation from 12% to 100%.

A. Silane Functionalized Ethylene-Based Polymer

The crosslinked polymeric composition includes a silane functionalized ethylene-based polymer. A "silane functionalized ethylene-based polymer" is a polymer that contains silane and equal to or greater than 50 wt %, or a majority amount, of polymerized ethylene, based on the total weight of the polymer. Nonlimiting examples of suitable silane functionalized polyolefin include ethylene/silane copolymer, silane-grafted polyethylene (Si-g-PE), and combinations thereof.

An "ethylene/silane copolymer" is formed by the copolymerization of ethylene and a hydrolysable silane monomer (such as a vinyl alkoxysilane monomer). In an embodiment, the ethylene/silane copolymer is prepared by the copolymerization of ethylene, a hydrolysable silane monomer and, optionally, an unsaturated ester. The preparation of ethylene/silane copolymers is described, for example, in U.S. Pat. Nos. 3,225,018 and 4,574,133, each incorporated herein by reference.

A "silane-grafted polyethylene" (or "Si-g-PE") is formed by grafting a hydrolysable silane monomer (such as a vinyl alkoxysilane monomer) onto the backbone of a base polyethylene. In an embodiment, grafting takes place in the presence of a free-radical generator, such as a peroxide. The hydrolysable silane monomer can be grafted to the backbone of the base polyethylene (i) prior to incorporating or compounding the Si-g-PE into a composition used to make a final article, such as a coated conductor (also known as a SIOPLAS™ process), or (ii) simultaneously with the extrusion of a composition to form a final article (also known as a MONOSIL™ process, in which the Si-g-PE is formed in situ during melt blending and extrusion). In an embodiment, the Si-g-PE is formed before the Si-g-PE is compounded with inorganic hollow microspheres, and other optional components. In another embodiment, the Si-g-PE is formed in situ by compounding a polyethylene, hydrolysable silane monomer, and peroxide initiator, along with inorganic hollow microspheres, and other optional components.

The base polyethylene for the Si-g-PE may be any ethylene-based polymer disclosed herein. Non-limiting examples of suitable ethylene-based polymers include ethylene homopolymers and ethylene-based interpolymers containing one or more polymerizable comonomers, such as an unsaturated ester and/or an α-olefin. In an embodiment, the ethylene-based polymer is selected from a low density polyethylene (LDPE), a high density polyethylene (HDPE), and combination thereof.

The hydrolysable silane monomer used to make an ethylene/silane copolymer or a Si-g-PE is a silane-containing monomer that will effectively copolymerize with ethylene to form an ethylene/silane copolymer or graft to an ethylene-based polymer to form a Si-g-PE. Exemplary hydrolysable silane monomers are those having the following Structure (A):

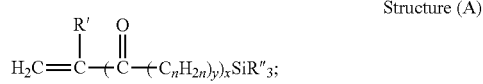

Structure (A)

wherein R is a hydrogen atom or methyl group; x and y are 0 or 1 with the proviso that when x is 1, y is 1; n is an integer from 1 to 12 inclusive, or n is an integer from 1 to 4, and each R independently is a hydrolysable organic group such as an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (alkylamino, arylamino), or a lower alkyl group having 1 to 6 carbon atoms inclusive, with the proviso that not more than one of the three R" groups is an alkyl.

Nonlimiting examples of suitable hydrolysable silane monomers include silanes that have an ethylenically unsaturated hydrocarbyl group, such as vinyl, allyl, isopropenyl, butenyl, cyclohexenyl or gamma-(meth)acryloxy allyl group, and a hydrolysable group, such as, for example, a hydrocarbyloxy, hydrocarbonyloxy, or hydrocarbylamino group. Examples of hydrolysable groups include methoxy, ethoxy, formyloxy, acetoxy, propionyloxy, and alkyl or arylamino groups.

In an embodiment, the hydrolysable silane monomer is an unsaturated alkoxy silane such as vinyl trimethoxy silane (VTMS), vinyl triethoxy silane, vinyl triacetoxy silane, gamma-(meth)acryloxy, propyl trimethoxy silane, and mixtures of these silanes.

Nonlimiting examples of suitable unsaturated esters used to make an ethylene/silane copolymer include alkyl acrylate, alkyl methacrylate, or vinyl carboxylate. Nonlimiting examples of suitable alkyl groups include methyl, ethyl, n-propyl, i-propyl, n-butyl, t-butyl, etc. In an embodiment, the alkyl group has from 1, or 2 to 4, or 8 carbon atoms. Nonlimiting examples of suitable alkyl acrylates include ethyl acrylate, methyl acrylate, t-butyl acrylate, n-butyl acrylate, and 2-ethylhexyl acrylate. Nonlimiting examples of suitable alkyl methacrylates include methyl methacrylate and n-butyl methacrylate. In an embodiment, the carboxylate group has from 2 to 5, or 6, or 8 carbon atoms. Nonlimiting examples of suitable vinyl carboxylates include vinyl acetate, vinyl propionate, and vinyl butanoate.

In an embodiment, the silane functionalized ethylene-based polymer contains from 0.1 wt %, or 0.3 wt %, or 0.5 wt %, or 0.8 wt %, or 1.0 wt %, or 1.2 wt %, or 1.5 wt %, or 1.6 wt % to 1.8 wt %, or 2.0 wt %, or 2.3 wt %, or 2.5 wt %, or 3.0 wt %, or 3.5 wt %, or 4.0 wt %, or 4.5 wt %, or 5.0 wt % silane, based on the total weight of the silane functionalized ethylene-based polymer.

In an embodiment, the silane functionalized ethylene-based polymer contains (i) from 50 wt %, or 55 wt %, or 60 wt %, or 65 wt %, or 70 wt %, or 80 wt %, or 90 wt %, or 95 wt % to 97 wt %, or 98 wt %, or 99 wt %, or less than 100 wt % ethylene and (ii) from 0.1 wt %, or 0.3 wt % or 0.5 wt %, or 0.8 wt %, or 1.0 wt %, or 1.2 wt %, or 1.5 wt %, or 1.6 wt % to 1.8 wt %, or 2.0 wt %, or 2.3 wt %, or 2.5 wt %, or 3.0 wt %, or 3.5 wt %, or 4.0 wt %, or 4.5 wt %, or 5.0 wt % silane, based on the total weight of the silane functionalized polyethylene.

In an embodiment, the silane functionalized ethylene-based polymer has a density from 0.850 g/cc, or 0.860 g/cc, or 0.875 g/cc, or 0.890 g/cc, or 0.900 g/cc, or 0.910 g/cc, or 0.915 g/cc, or 0.920 g/cc to 0.925 g/cc, or 0.930 g/cc, or 0.940 g/cc, or 0.950 g/cc or 0.960 g/cc, or 0.965 g/cc. In another embodiment, the silane functionalized ethylene-based polymer has a density from 0.850 g/cc to 0.965 g/cc, or from 0.900 g/cc to 0.950 g/cc, or from 0.920 g/cc to 0.925 g/cc.

In an embodiment, the silane functionalized ethylene-based polymer has a melt index (MI) from 0.1 g/10 min, or 0.5 g/10 min, or 1.0 g/10 min, or 1.5 g/10 min to 6 g/10 min, or 10 g/10 min, or 15 g/10 min, or 20 g/10 min, or 30 g/10 min, or 40 g/10 min, or 50 g/10 min. In another embodiment, the functionalized ethylene-based polymer has a melt index (MI) from 0.1 g/10 min to 50 g/10 min, or from 0.5 g/10 min to 10 g/10 min.

In an embodiment, the silane functionalized ethylene-based polymer is an ethylene/silane copolymer. The ethylene/silane copolymer contains ethylene and the hydrolyzable silane monomer as the only monomeric units. In another embodiment, the ethylene/silane copolymer optionally includes a $C_3$, or $C_4$ to $C_6$, or $C_8$, or $C_{10}$, or $C_{12}$, or $C_{16}$, or $C_{18}$, or $C_{20}$ α-olefin; an unsaturated ester; and combinations thereof. In an embodiment, the ethylene/silane copolymer is an ethylene/unsaturated ester/silane reactor copolymer. Non-limiting examples of suitable ethylene/silane copolymers include SI-LINK™ DFDA-5451 NT and SI-LINK™ AC DFDB-5451NT, each available from The Dow Chemical Company.

The ethylene/silane reactor copolymer may comprise two or more embodiments disclosed herein.

In an embodiment, the silane functionalized ethylene-based polymer is a Si-g-PE.

The base ethylene-based polymer for the Si-g-PE includes from 50 wt %, or 55 wt %, or 60 wt %, or 65 wt %, or 70 wt %, or 80 wt %, or 90 wt %, or 95 wt % to 97 wt %, or 98 wt %, or 99 wt %, or 100 wt % ethylene, based on the total weight of the base ethylene-based polymer.

In an embodiment, the base ethylene-based polymer for the Si-g-PE has a density from 0.850 g/cc, or 0.860 g/cc, or 0.875 g/cc, or 0.890 g/cc, or 0.900 g/cc, or 0.910 g/cc, or 0.915 g/cc, or 0.920 g/cc to 0.925 g/cc, or 0.930 g/cc, or 0.940 g/cc, or 0.950 g/cc or 0.960 g/cc, or 0.965 g/cc. In another embodiment, the base ethylene-based polymer for the Si-g-PE has a density from 0.850 g/cc to 0.965 g/cc, or from 0.900 g/cc to 0.950 g/cc, or from 0.920 g/cc to 0.925 g/cc.

In an embodiment, the base ethylene-based polymer for the Si-g-PE has a melt index (MI) from 0.1 g/10 min, or 0.5 g/10 min, or 1.0 g/10 min, or 1.5 g/10 min to 6 g/10 min, or 10 g/10 min, or 15 g/10 min, or 20 g/10 min, or 30 g/10 min, or 40 g/10 min, or 50 g/10 min. In another embodiment, base ethylene-based polymer for the Si-g-PE has a melt index (MI) from 0.1 g/10 min to 50 g/10 min, or from 0.5 g/10 min to 10 g/10 min.

In an embodiment, the base ethylene-based polymer for the Si-g-PE is an ethylene/α-olefin copolymer. The α-olefin contains from 3, or 4 to 6, or 8, or 10, or 12, or 16, or 18, or 20 carbon atoms. Non-limiting examples of suitable α-olefin include propylene, butene, hexene, and octene. In an embodiment, the ethylene-based copolymer is an ethylene/octene copolymer. When the ethylene-based copolymer is an ethylene/α-olefin copolymer, the Si-g-PE is a silane-grafted ethylene/α-olefin copolymer. Non-limiting examples of suitable ethylene/α-olefin copolymers useful as the base ethylene-based polymer for the Si-g-PE include the ENGAGE™ and INFUSE™ resins available from the Dow Chemical Company.

In an embodiment, the base ethylene-based polymer for the Si-g-PE is a low density polyethylene (LDPE). LDPE consists of ethylene homopolymer, or ethylene/α-olefin copolymer comprising at least one $C_3$-$C_{10}$ α-olefin, or $C_3$-$C_4$ α-olefin that has a density from 0.915 g/cc to 0.940 g/cc and contains long chain branching with broad MWD. In an embodiment, the LDPE has a density from 0.915 g/cc, or 0.920 g/cc to 0.925 g/cc, or 0.930 g/cc, or 0.940 g/cc.

In an embodiment, the Si-g-PE is a silane-grafted ethylene/$C_4$-$C_8$ α-olefin copolymer. The silane-grafted ethylene/$C_4$-$C_8$ α-olefin copolymer consists of the hydrolyzable silane monomer, ethylene, and $C_4$-$C_8$ α-olefin comonomer. In other words, the silane-grafted ethylene/$C_4$-$C_8$ α-olefin copolymer contains the hydrolyzable silane monomer, ethylene, and $C_4$-$C_8$ α-olefin comonomer as the only monomeric units.

In an embodiment, the Si-g-PE is a silane-grafted LDPE ("Si-g-LDPE"). The Si-g-LDPE has one, some, or all of the following properties: (i) a density from 0.915 g/cc to 0.940 g/cc, or from 0.920 g/cc to 0.930 g/cc; and/or (ii) a melt index from 0.1 g/10 min to 50 g/10 min, or from 0.5 g/10 min to 10 g/10 min; and/or (iii) a silane content from 0.1 wt % to 5 wt %, or from 0.5 wt % to 3.0 wt %, based on the total weight of the Si-g-LDPE. In a further embodiment, the Si-g-LDPE consists of the hydrolyzable silane monomer, ethylene, and $C_4$-$C_8$ α-olefin comonomer.

The Si-g-PE may comprise two or more embodiments disclosed herein.

Blends of silane functionalized ethylene-based polymers may also be used, and the silane-functionalized ethylene-based polymer(s) may be diluted with one or more other polyolefins to the extent that the polyolefins are (i) miscible or compatible with one another, and (ii) the silane functionalized ethylene-based polymer(s) constitutes from 50 wt %, or 55 wt %, or 60 wt %, or 65 wt %, or 70 wt %, or 75 wt %, or 80 wt %, or 85 wt %, or 90 wt %, or 95 wt %, or 98 wt %, or 99 wt % to less than 100 wt % of the blend (based on the combined weight of the polyolefins, including the silane functionalized ethylene-based polymer).

The silane functionalized ethylene-based polymer may comprise two or more embodiments disclosed herein.

B. Inorganic Hollow Microspheres

The crosslinked polymeric composition contains inorganic hollow microspheres. The inorganic hollow microspheres have (i) a Do particle size from 10 μm to 100 μm, (ii) a crush strength from 17 MPa to 140 MPa, and (iii) a density from 0.10 g/cc to 0.40 g/cc.

An "inorganic hollow microsphere" is a spherical particle having a core and shell structure, wherein the core is hollow and is filled with a gas (such as air) at or below atmospheric pressure, and the shell is an inorganic substance.

Nonlimiting examples of suitable inorganic substances include glass (containing a majority weight percent, or greater than 50 wt %, or greater than 80 wt % silicon dioxide) and ceramic.

In an embodiment, the inorganic hollow microspheres are glass hollow microspheres.

The inorganic hollow microspheres have a crush strength from 17 MPa to 140 MPa. In an embodiment, the inorganic hollow microspheres have a crush strength from 17 MPa, or 20 MPa to 42 MPa, or 45 MPa, or 48 MPa, or 49 MPa, or 50 MPa, or 55 MPa, or 60 MPa, or 65 MPa, or 70 MPa, or 80 MPa, or 90 MPa, or 100 MPa, or 120 MPa, or 140 MPa. In another embodiment, the inorganic hollow microspheres have a crush strength from 17 MPa to 70 MPa, or from 20 MPa to 70 MPa, or from 17 MPa to 49 MPa, or from 20 MPa to 42 MPa.

Not wishing to be bound by any particular theory, it is believed that inorganic hollow microspheres having a crush strength of less than 17 MPa will undergo breakage during compounding with the crosslinkable polymeric composition, thereby compromising the desired reduction in dielectric constant that is driven by the incorporation of voids such as by the inorganic hollow microspheres. On the other hand, inorganic hollow microspheres having a crush strength of greater than 140 MPa have a high density (greater than 0.40 g/cc) because high crush strength is the result of a thicker shell in the inorganic hollow microspheres. Therefore, at the same volume loading, inorganic hollow microspheres having a crush strength of greater than 140 MPa will result in a crosslinked polymeric composition having a density greater than 0.800 g/cc that will not achieve the desired reduction in dielectric constant.

The inorganic hollow microspheres have a density from 0.10 g/cc to 0.40 g/cc. In an embodiment, the inorganic hollow microspheres have a density from 0.10 g/cc, or 0.15 g/cc, or 0.20 g/cc, or 0.23 g/cc to 0.32 g/cc, or 0.35 g/cc, or 0.40 g/cc. In another embodiment, the inorganic hollow microspheres have a density from 0.20 g/cc to 0.35 g/cc, or from 0.23 g/cc to 0.32 g/cc.

The inorganic hollow microspheres have a $D_{90}$ particle size from 10 μm to 100 μm. In an embodiment, the inorganic hollow microspheres have a $D_{90}$ particle size from 10 μm, or 20 μm, or 30 μm, or 40 μm to 70 μm, or 80 μm, or 90 μm, or 100 μm. In another embodiment, the inorganic hollow microspheres have a $D_{90}$ particle size from 30 μm to 100 μm, or from 40 μm to 100 μm, or from 20 μm to 70 μm, or from 40 μm to 70 μm.

In an embodiment, the inorganic hollow microspheres have a $D_{50}$ particle size from 10 μm, or 20 μm, or 30 μm to 50 μm, or 60 μm, or 70 μm, or 80 μm, or 90 μm, or 100 μm.

In an embodiment, the inorganic hollow microspheres have a $D_{10}$ particle size from 10 μm, or 15 μm to 20 μm, or 30 μm, or 50 μm, or 80 μm, or 90 μm, or 100 μm.

In an embodiment, the inorganic hollow microspheres are glass hollow microspheres having (i) a $D_{90}$ particle size from 10 μm to 100 μm, or from 30 μm to 100 μm, or from 40 μm to 100 μm, or from 20 μm to 70 μm, or from 40 μm to 70 μm; (ii) a crush strength from 17 MPa to 140 MPa, or from 17 MPa to 70 MPa, or from 20 MPa to 70 MPa, or from 17 MPa to 49 MPa, or from 20 MPa to 42 MPa; and (iii) a density from 0.10 g/cc to 0.40 g/cc, or from 0.20 g/cc to 0.35 g/cc, or from 0.23 g/cc to 0.32 g/cc. In another embodiment, the glass hollow microspheres have one or both of the following properties: (iv) a $D_{50}$ particle size from 10 μm to 100 μm, or from 30 μm to 70 μm, and/or (v) a $D_{10}$ particle size from 10 μm to 100 μm, or from 10 μm to 50 μm.

Nonlimiting examples of suitable glass hollow microspheres include Glass Bubble S32HS and Glass Bubble XLD3000, each available from 3M™.

In an embodiment, the crosslinked polymeric composition is void of, or substantially void of, inorganic hollow microspheres that are physically and/or structurally distinct from the present inorganic hollow microspheres that have (i) a $D_{90}$ particle size from 10 μm to 100 μm, (ii) a crush strength from 17 MPa to 140 MPa, and (iii) a density from 0.10 g/cc to 0.40 g/cc. In other words, the crosslinked polymeric composition excludes inorganic hollow microspheres that have a $D_{90}$ particle size, a crush strength, and/or a density outside the following ranges: (i) a $D_{90}$ particle size from 10 μm to 100 μm, (ii) a crush strength from 17 MPa to 140 MPa, and (iii) a density from 0.10 g/cc to 0.40 g/cc.

The inorganic hollow microspheres may comprise two or more embodiments disclosed herein.

C. Optional Additive

In an embodiment, the crosslinked polymeric composition includes (A) the silane functionalized ethylene-based polymer, (B) the inorganic hollow microspheres, and (C) one or more optional additives.

Nonlimiting examples of suitable optional additives include antioxidants, colorants, corrosion inhibitors, lubricants, silanol condensation catalysts, ultra violet (UV) absorbers or stabilizers, anti-blocking agents, coupling agents, compatibilizers, plasticizers, fillers, processing aids, moisture scavengers, scorch retardants, metal deactivators, siloxanes, crosslinking coagents, extends oils, and combinations thereof.

In an embodiment, the composition includes an antioxidant. "Antioxidant" refers to types or classes of chemical compounds that are capable of being used to minimize the oxidation that can occur during the processing of polymers. Nonlimiting examples of suitable antioxidants include high molecular weight hindered phenols and multifunctional phenols such as sulfur and phosphorous-containing phenol. A nonlimiting example of a suitable hindered phenol is pentaerythritol tetrakis(3-(3,5-di-tert-butyl-4-hydroxyphenyl) propionate), commercially available as Irganox 1010 from BASF. In an embodiment, the composition contains from 0 wt %, or 0.05 wt %, or 0.1 wt % to 0.2 wt %, or 0.3 wt %, or 0.4 wt %, or 0.5 wt %, or 0.6 wt %, or 0.7 wt %, or 0.8 wt %, or 1.0 wt %, or 2.0 wt %, or 2.5 wt %, or 3.0 wt % antioxidant, based on total weight of the composition.

In an embodiment, the composition includes silanol condensation catalyst, such as Lewis and Brønsted acids and bases. A "silanol condensation catalyst" promotes crosslinking of the silanol functionalized polyolefin. Lewis acids are chemical species that can accept an electron pair from a Lewis base. Lewis bases are chemical species that can donate an electron pair to a Lewis acid. Nonlimiting examples of suitable Lewis acids include the tin carboxylates such as dibutyl tin dilaurate (DBTDL), and various other organo-metal compounds such as lead naphthenate, zinc caprylate and cobalt naphthenate. Nonlimiting examples of suitable Lewis bases include the primary, secondary and tertiary amines. These catalysts are typically used in moisture cure applications. In an embodiment, the composition includes from 0 wt %, or 0.001 wt %, or 0.005 wt %, or 0.01 wt %, or 0.02 wt %, or 0.03 wt % to 0.05 wt %, or 0.1 wt %, or 0.2 wt %, or 0.5 wt %, or 1.0 wt % silanol condensation catalyst, based on the total weight of the composition. During the MONOSIL™ process, the silanol condensation catalyst is typically added to the reaction-extruder so that it is present during the grafting reaction of silane to the polyolefin backbone to form the in situ Si-g-PE. As such, the silane functionalized ethylene-based polymer may experience some coupling (light crosslinking) before it leaves the extruder with the completion of the crosslinking after it has left the extruder, typically upon exposure to moisture (e.g., a sauna bath or a cooling bath) and/or the humidity present in the environment in which it is stored, transported or used.

In an embodiment, the silanol condensation catalyst is included in a catalyst masterbatch blend, and the catalyst masterbatch is included in the composition. Nonlimiting examples of suitable catalyst masterbatches include those sold under the trade name SI-LINK™ from The Dow Chemical Company, including SI-LINK™ DFDA-5481 Natural. SI-LINK™ DFDA-5481 Natural is a catalyst masterbatch containing a blend of 1-butene/ethene polymer, ethene homopolymer, phenolic compound antioxidant, dibutyltin dilaurate (DBTDL) (a silanol condensation catalyst), and a phenolic hydrazide compound. In an embodiment, the composition contains from 0 wt %, or 0.001 wt %, or 0.01 wt %, or 0.1 wt %, or 0.3 wt %, or 0.5 wt %, or 1.0 wt %, or 2.0 wt %, or 3.0 wt %, or 4.0 wt % to 5.0 wt %, or 6.0 wt %, or 7.0 wt %, or 8.0 wt %, or 9.0 wt %, or 10.0 wt % silanol condensation catalyst or catalyst masterbatch, based on total weight of the composition.

In an embodiment, the composition includes an ultra violet (UV) absorber or stabilizer. A nonlimiting example of a suitable UV stabilizer is a hindered amine light stabilizer (HALS), such as 1,3,5-Triazine-2,4,6-triamine, N,N-1,2-ethanediylbisN-3-4,6-bisbutyl(1,2,2,6,6-pentamethyl-4-piperidinyl)amino-1,3,5-triazin-2-ylaminopropyl-N,N-dibutyl-N,N-bis(1,2,2,6,6-pentamethyl-4-piperidinyl)-1,5,8,12-tetrakis[4,6-bis(n-butyl-n-1,2,2,6,6-pentamethyl-4-piperidylamino)-1,3,5-triazin-2-yl]-1,5,8,12-tetraazadodecane, which is commercially available as SABO™ STAB UV-119 from SABO S.p.A. of Levate, Italy. In an embodiment, the composition contains from 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.1 wt %, or 0.2 wt %, or 0.3 wt %, or 0.4 wt %, or 0.5 wt %, or 1.0 wt %, or 2.0 wt %, or 2.5 wt %, or 3.0 wt % UV absorber or stabilizer, based on total weight of the composition.

In an embodiment, the composition includes a metal deactivator. Metal deactivators suppress the catalytic action of metal surfaces and traces of metallic minerals. Metal deactivators convert the traces of metal and metal surfaces into an inactive form, e.g., by sequestering. Non-limiting examples of suitable metal deactivators include 1,2-bis(3,5-di-tert-butyl-4-hydroxyhydrocinnamoyl)hydrazine, 2,2'-oxamindo bis[ethyl 3-(3,5-di-tert-butyl-4-hydroxyphenyl)propionate], and oxalyl bis(benzylidenehydrazide) (OABH). The metal deactivator is present in an amount from 0 wt %, or greater than 0 wt %, or 0.01 wt %, or 0.02 wt %, or 0.03 wt %, or 0.04 wt % to 0.05 wt %, or 0.1 wt %, or 0.5 wt %, or 1 wt %, or 2 wt %, or 3 wt %, or 5 wt %, or 8 wt %, or 10 wt %, based on the total weight of the composition.

In an embodiment, the composition includes a filler. Nonlimiting examples of suitable fillers include zinc oxide, zinc borate, zinc molybdate, zinc sulfide, carbon black, organo-clay, and combinations thereof. The filler may or may not have flame retardant properties. In an embodiment, the filler is coated with a material (such as stearic acid) that will prevent or retard any tendency that the filler might otherwise have to interfere with the silane cure reaction. In an embodiment, the composition contains from 0 wt %, or 0.01 wt %, or 0.05 wt %, or 0.1 wt %, or 0.2 wt %, or 0.5 wt %, or 0.6 wt %, or 0.8 wt % to 1.0 wt %, or 2.0 wt %, or 2.5 wt %, or 3.0 wt %, or 5.0 wt % filler, based on total weight of the composition.

In an embodiment, the composition includes a processing aid. Nonlimiting examples of suitable processing aids include oils, organic acids (such as stearic acid), and metal salts of organic acids (such as zinc stearate). In an embodiment, the composition contains from 0 wt %, or 0.01 wt %, or 0.02 wt %, or 0.05 wt %, or 0.1 wt %, or 0.2 wt %, or 0.3 wt %, or 0.5 wt %, or 0.6 wt %, or 0.7 wt % to 1.0 wt %, or 2.0 wt %, or 2.5 wt %, or 3.0 wt % processing aid, based on total weight of the composition.

In an embodiment, the composition includes a moisture scavenger. Moisture scavengers remove or deactivate unwanted water in the composition to prevent unwanted (premature) crosslinking and other water-initiated reactions in the composition during storage or at extrusion conditions. Non-limiting examples of moisture scavengers include organic compounds selected from ortho esters, acetals, ketals or silanes such as alkoxy silanes. In an embodiment, the moisture scavenger is an alkoxy silane (e.g., hexadecyltrimethoxysilane, octyltrimethoxysilane, or octyltriethoxysilane). The alkoxy silane moisture scavenger is not grafted to or copolymerized with a polyolefin. The moisture scavenger is present in an amount from 0 wt %, or greater than 0 wt %, or 0.01 wt %, or 0.02 wt %, or 0.03 wt %, or 0.04 wt %, or 0.05 wt %, or 0.1 wt % to 0.2 wt %, or 0.3 wt %, or 0.5 wt %, or 0.75 wt %, or 1.0 wt %, based on the total weight of the composition.

In an embodiment, the composition includes a siloxane. A nonlimiting example of a suitable siloxane is a polydimethylsiloxane (PDMS). A nonlimiting example of a suitable PDMS is dimethylvinylsilyl terminated polydimethylsiloxane. In an embodiment, PDMS is included in a PDMS masterbatch blend, and the PDMS masterbatch is included in the composition. A nonlimiting example of a suitable PDMS masterbatch is MB50-002 Masterbatch, available from Dow Corning. MB50-002 Masterbatch includes 50 wt % dimethylvinylsilyl terminated PDMS dispersed in LDPE, based on the total weight of the masterbatch. In an embodiment, the composition contains from 0.2 wt %, or 0.5 wt %, or 0.8 wt % to 1.0 wt %, or 1.5 wt %, or 2.0 wt %, or 2.5 wt %, or 3.0 wt %, or 5.0 wt % siloxane, based on the total weight of the composition.

In an embodiment, the composition includes a crosslinking coagent. A "crosslinking coagent" is a substance that improves the crosslinking efficiency of a composition. A nonlimiting example of a suitable crosslinking coagent is triallyl isocyanurate (TAIC). In an embodiment, the composition contains from 0 wt %, or greater than 0 wt %, or 0.1 wt % to 0.5 wt %, or 1.0 wt % crosslinking coagent, based on the total weight of the composition.

In an embodiment, the composition contains from 0 wt %, or greater than 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.1 wt %, or 0.2 wt %, or 0.3 wt %, or 0.4 wt %, or 0.5 wt %, or 1.0 wt %, or 2.0 wt %, or 2.5 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt % additive, based on the total weight of the composition.

The additive may comprise two or more embodiments disclosed herein.

D. Crosslinked Polymeric Composition

The crosslinked polymeric composition contains (A) the silane functionalized ethylene-based polymer, (B) the inorganic hollow microspheres, and, optionally (C) an additive. The crosslinked polymeric composition has a tensile strength from 11 MPa to 40 MPa and a tensile elongation from 12% to 100%.

The crosslinked polymeric composition is formed by crosslinking a crosslinkable polymeric composition. In an embodiment, the crosslinking of the crosslinkable polymeric composition begins in an extruder. In another embodiment, crosslinking is delayed until the crosslinkable polymeric composition is extruded, such as upon a conductor. Crosslinking of the crosslinkable polymeric composition can be initiated and/or accelerated through exposure to humid environment (e.g., ambient conditions or cure in a sauna or water bath), and/or the application of heat (including when peroxides are used for crosslinking) or radiation. In an embodiment, crosslinking of the crosslinkable polymeric composition is initiated and/or accelerated through the application of heat, such as at a temperature from 110° C., or 120° C., or 130° C. to 140° C., or 150° C.

The crosslinked polymeric composition includes bonds between the silane functionalized ethylene-based polymer chains and the inorganic hollow microspheres. Not wishing to be bound by any particular theory, it is believed that crosslinking improves the stability of the inorganic hollow microspheres dispersed throughout the silane functionalized ethylene-based polymer matrix, improves the crosslinked mechanical performance (as evidenced by a tensile strength of at least 11 MPa and a tensile elongation of at least 12%), and contributes to the lowering of dielectric constant to 2.06 or less.

FIG. 1 shows a schematic representation of the present crosslinked polymeric composition containing glass hollow microspheres 2 bound to silane functionalized ethylene-based polymer chains 4 via a silane linkage. Specifically, the silanol group present in the glass hollow microspheres 2 (from the silicon dioxide) can be coupled with the silane in the silane functionalized ethylene-based polymer chains 4 via a condensation reaction.

In an embodiment, the crosslinkable polymeric composition contains (A) the ethylene/silane copolymer, (B) the inorganic hollow microspheres, and optionally, (C) an additive. In another embodiment, the crosslinkable polymeric composition contains, consists essentially of, or consists of: (A) from 75 wt %, or 80 wt %, or 85 wt %, or 90 wt % to 92 wt %, or 95 wt %, or 99 wt % ethylene/silane copolymer, (B) from 1 wt %, or 5 wt %, or 8 wt % to 16 wt %, or 18 wt %, or 20 wt %, or 25 wt % the inorganic hollow microspheres; and optionally, (C) from 0 wt %, or greater than 0 wt %, or 1 wt % to 5 wt % additive, based on the total weight of the crosslinkable polymeric composition. The crosslinkable composition is the present composition before crosslinking.

In an embodiment, the crosslinkable polymeric composition contains an ethylene-based polymer (i.e., the base ethylene-based polymer of the Si-g-PE), hydrolyzable silane monomer, peroxide (such as di-tertiary amyl peroxide (DTAP)), the inorganic hollow microspheres, and optionally, an additive. During extrusion, the ethylene-based polymer, hydrolyzable silane monomer, and peroxide react to form the Si-g-PE. In an embodiment, the crosslinkable polymeric composition contains, consists essentially of, or consists of: from 75 wt %, or 80 wt %, or 83 wt % to 91 wt %, or 95 wt %, or 99 wt % ethylene-based polymer (i.e., the base ethylene-based polymer of the Si-g-PE); from greater than 0 wt %, or 0.01 wt %, or 0.1 wt %, or 0.3 wt % to 0.7 wt %, or 0.8 wt %, or 1.0 wt % hydrolyzable silane monomer; from greater than 0 wt %, or 0.01 wt %, or 0.02 wt %, or 0.04 wt % to 0.05 wt %, or 0.06 wt %, or 0.10 wt %, or 0.5 wt % peroxide (such as di-tertiary amyl peroxide (DTAP)); from 1 wt %, or 5 wt %, or 8 wt % to 16 wt %, or 18 wt %, or 20 wt %, or 25 wt % the inorganic hollow microspheres; and optionally, from 0 wt %, or 1 wt % to 5 wt % additive, based on the total weight of the crosslinkable polymeric composition.

In an embodiment, the crosslinked polymeric composition contains, consists essentially of, or consists of: (A) from 75 wt % to 99 wt %, or from 80 wt % to 95 wt % silane functionalized ethylene-based polymer (e.g., ethylene/silane copolymer or Si-g-LDPE) and a reciprocal amount of (B) inorganic hollow microspheres, or from 1 wt % to 25 wt %, or from 5 wt % to 20 wt % inorganic hollow microspheres, based on the total weight of the crosslinked polymeric composition. The crosslinked composition is the present composition after crosslinking.

In an embodiment, the crosslinked polymeric composition contains, consists essentially of, or consists of (A) from 75 wt % to 99 wt %, or from 80 wt % to 95 wt % silane functionalized ethylene-based polymer (e.g., ethylene/silane copolymer or Si-g-LDPE); (B) from 1 wt % to 25 wt %, or from 5 wt % to 20 wt % inorganic hollow microspheres; and optionally, (C) from 0 to 5 wt %, or from 0.01 wt % to 5 wt % additive, based on the total weight of the crosslinked polymeric composition.

The crosslinked polymeric composition has a tensile strength from 11 MPa to 40 MPa and a tensile elongation from 12% to 100%. In an embodiment, the crosslinked polymeric composition has a tensile strength from 11 MPa to 20 MPa, or from 11 MPa to 16 MPa and a tensile elongation from 14% to 50%, or from 14% to 40%. A tensile strength of greater than 11 MPa in combination with a tensile elongation of greater than 12% is advantageous in wire and cable applications because it demonstrates a desirable balance of mechanical performance.

In an embodiment, the crosslinked polymeric composition containing the silane functionalized ethylene-based polymer and the inorganic hollow microspheres has a density from 0.650 g/cc, or 0.700 g/cc, or 0.710 g/cc to 0.770 g/cc, or 0.775 g/cc, or 0.780 g/cc, or 0.790 g/cc, or 0.800 g/cc. In another embodiment, the crosslinked polymeric composition has a density from 0.650 g/cc to 0.800 g/cc, or from 0.700 g/cc to 0.780 g/cc, or from 0.700 g/cc to 0.770 g/cc.

In an embodiment, the crosslinked polymeric composition has a dielectric constant (DC) from 1.80, or 1.85, or 1.90, or 1.95, or 1.99 to 2.06. In another embodiment, the crosslinked polymeric composition has a DC from 1.80 to 2.06, or from 1.90 to 2.06, or from 1.99 to 2.06. A dielectric constant of less than 2.08 is advantageous in wire and cable applications because reduced dielectric constant leads to low signal attenuation and sufficient signal transmission (e.g., higher transmission capacity and higher transmission rate).

In an embodiment, the crosslinked polymeric composition contains, consists essentially of, or consists of (A) from 75 wt % to 99 wt %, or from 80 wt % to 95 wt % silane functionalized ethylene-based polymer (e.g., ethylene/silane copolymer or Si-g-LDPE); (B) from 1 wt % to 25 wt %, or from 5 wt % to 20 wt % glass hollow microspheres; and optionally, (C) from 0 to 5 wt %, or from 0.01 wt % to 5 wt % additive, based on the total weight of the crosslinked polymeric composition. The crosslinked polymeric composition has (i) a tensile strength from 11 MPa to 40 MPa, or from 11 MPa to 20 MPa, or from 11 MPa to 16 MPa; and (ii) a tensile elongation from 12% to 100%, or from 14% to 50%, or from 14% to 40%. In a further embodiment, the crosslinked polymeric composition has one, some, or all of the following properties: (iii) a density from 0.650 g/cc to 0.800 g/cc, or from 0.700 g/cc to 0.780 g/cc, or from 0.700 g/cc to 0.770 g/cc; and/or (iv) a DC from 1.80 to 2.06, or from 1.90 to 2.06, or from 1.99 to 2.06.

It is understood that the sum of the components in each of the foregoing compositions yields 100 weight percent (wt %).

In an embodiment, the crosslinked polymeric composition is void of, or substantially void of, polymeric components other than the silane functionalized ethylene-based polymer.

In an embodiment, the crosslinked polymeric composition is void of, or substantially void of, propylene-based polymer, such as silane functionalized propylene-based polymer and maleic acid functionalized propylene-based polymer.

In an embodiment, the crosslinked polymeric composition is void of, or substantially void of, polyamide. Not wishing to be bound by any particular theory, it is believed that the polarity of polyamide will result in a crosslinked polymeric composition exhibiting a DC greater than 2.06.

In an embodiment, the crosslinked polymeric composition is void of, or substantially void of, fluoropolymers, such as polytetrafluoroethylene (PTFE).

The crosslinked polymeric composition microspheres may comprise two or more embodiments disclosed herein.

E. Coated Conductor

The present disclosure provides a coated conductor. The coated conductor includes a conductor and a coating on the conductor, the coating including a crosslinked polymeric composition. The crosslinked polymeric composition contains (A) a silane functionalized ethylene-based polymer and (B) inorganic hollow microspheres having (i) a $D_{90}$ particle size from 10 μm to 100 μm, (ii) a crush strength from 17 MPa to 140 MPa, and (iii) a density from 0.10 g/cc to 0.40 g/cc. The crosslinked polymeric composition has a tensile strength from 11 MPa to 40 MPa and a tensile elongation from 12% to 100%.

The crosslinked polymeric composition may be any crosslinked polymeric composition disclosed herein.

In an embodiment, the crosslinked polymeric composition contains (A) the silane functionalized ethylene-based polymer, (B) the inorganic hollow microspheres having (i) a $D_{90}$ particle size from 10 μm to 100 μm, (ii) a crush strength from 17 MPa to 140 MPa, and (iii) a density from 0.10 g/cc to 0.40 g/cc; and optionally, (C) an additive.

The silane functionalized ethylene-based polymer, the inorganic hollow microspheres, and the optional additive may be any respective silane functionalized ethylene-based polymer, inorganic hollow microspheres, and optional additive disclosed herein.

In an embodiment, the coating is an insulation sheath for a conductor. In another embodiment, the coating is a jacket for a conductor.

The process for producing a coated conductor includes heating the crosslinkable polymeric composition to at least the melting temperature of the silane functionalized ethylene-based polymer, and then extruding the polymeric melt blend onto the conductor. The term "onto" includes direct contact or indirect contact between the polymeric melt blend and the conductor. The polymeric melt blend is in an extrudable state. During and/or after extrusion, crosslinking occurs to form the crosslinked polymeric composition.

The coating is located on the conductor. The coating may be one or more inner layers such as an insulating layer. The coating may wholly or partially cover or otherwise surround or encase the conductor. The coating may be the sole component surrounding the conductor. When the coating is the sole component surrounding the conductor, the coating may serve as a jacket and/or an insulation. In an embodiment, the coating is the outermost layer on the coated conductor. Alternatively, the coating may be one layer of a multilayer jacket or sheath encasing the metal conductor. In an embodiment, the coating directly contacts the conductor. In another embodiment, the coating directly contacts an insulation layer surrounding the conductor.

In an embodiment, the coating directly contacts the conductor. The term "directly contacts," as used herein, is a coating configuration whereby the coating is located immediately adjacent to the conductor, the coating touches the conductor, and no intervening layers, no intervening coatings, and/or no intervening structures, are present between the coating and the conductor.

In another embodiment, the coating indirectly contacts the conductor. The term "indirectly contacts," as used herein, is a coating configuration whereby an intervening layer, an intervening coating, or an intervening structure, is present between the coating and the conductor. Nonlimiting examples of suitable intervening layers, intervening coatings, and intervening structures include insulation layers, moisture barrier layers, buffer tubes, and combinations thereof. Nonlimiting examples of suitable insulation layers include foamed insulation layers, thermoplastic insulation layers, crosslinked insulation layers, and combinations thereof.

The coating is crosslinked. In an embodiment, crosslinking of the crosslinkable polymeric composition begins in the extruder, but only to a minimal extent. In another embodiment, crosslinking is delayed until the crosslinkable polymeric composition is extruded upon the conductor. Crosslinking of the crosslinkable polymeric composition can be initiated and/or accelerated through exposure to humid environment (e.g., ambient conditions or cure in a sauna or water bath), and/or the application of heat (including when peroxides are used for crosslinking) or radiation. In an embodiment, crosslinking of the crosslinkable polymeric composition is initiated and/or accelerated through the application of heat, such as at a temperature from 110° C., or 120° C., or 130° C. to 140° C., or 150° C.

In an embodiment, the coating has a thickness from 0.13 mm to 0.76 mm.

In an embodiment, the coated conductor includes, consists essentially of, or consists of:

a conductor;

a coating on the conductor, the coating including, consisting essentially of, or consisting of a crosslinked polymeric composition including, consisting essentially of, or consisting of, based on the total weight of the crosslinked polymeric composition:

(A) from 75 wt % to 99 wt %, or from 80 wt % to 95 wt % silane functionalized ethylene-based polymer (e.g., ethylene/silane copolymer or Si-g-LDPE);

(B) from 1 wt % to 25 wt %, or from 5 wt % to 20 wt % glass hollow microspheres; and (C) from 0 to 5 wt %, or from 0.01 wt % to 5 wt % optional additive; the crosslinked polymeric composition has (i) a tensile strength from 11 MPa to 40 MPa, or from 11 MPa to 20 MPa, or from 11 MPa to 16 MPa;
(ii) a tensile elongation from 12% to 100%, or from 14% to 50%, or from 14% to 40%; the crosslinked polymeric composition optionally has one, some, or all of the following properties:
(iii) a density from 0.650 g/cc to 0.800 g/cc, or from 0.700 g/cc to 0.780 g/cc, or from 0.700 g/cc to 0.770 g/cc; and/or
(iv) a DC from 1.80 to 2.06, or from 1.90 to 2.06, or from 1.99 to 2.06; and the coating directly contacts the conductor.

In an embodiment, the coated conductor is selected from a fiber optic cable, a communications cable (such as a telephone cable, a local area network (LAN) cable, or a small form-factor pluggable (SFP) cable), a power cable, wiring for consumer electronics, a power cable, a power charger wire for cell phones and/or computers, computer data cords, power cords, appliance wiring material, home interior wiring material, consumer electronic accessory cords, and any combination thereof.

In another embodiment, the present crosslinked polymeric composition is melt-shaped into an article other than a coating on a conductor, e.g., an electrical connector or a component of an electrical connector.

The coated conductor may comprise two or more embodiments disclosed herein.

Byway of example, and not limitation, some embodiments of the present disclosure will now be described in detail in the following Examples.

EXAMPLES

The materials used in the examples are provided in Table 1 and Table 2 below.

TABLE 1

Materials

| Component | Specification | Source |
|---|---|---|
| SI-LINK™ DFDA-5451 NT | ethylene/silane copolymer density = 0.922 g/cc; melt index = 1.5 g/10 min | The Dow Chemical Company |
| AXELERON™ CX 1258 NT CPD | low density polyethylene (LDPE) density = 0.922 g/cc; melt index = 6.0 g/10 min | The Dow Chemical Company |
| VTMS | vinyltrimethylsilane ($C_5H_{12}Si$) hydrolyzable silane monomer | TCI |
| DTAP | di-tertiary amyl peroxide (CAS 10508-09-5) | Arkema |
| Glass Bubble K25 | glass hollow microspheres properties provided in Table 2 | 3M |
| Glass Bubble S32 | glass hollow microspheres properties provided in Table 2 | 3M |
| Glass Bubble S32HS | glass hollow microspheres properties provided in Table 2 | 3M |
| Glass Bubble XLD3000 | glass hollow microspheres properties provided in Table 2 | 3M |
| Glass Bubble iM16K | glass hollow microspheres properties provided in Table 2 | 3M |

TABLE 2

Glass Hollow Microsphere Properties

| | Density (g/cc) | Crush Strength (MPa) | $D_{10}$ (μm) | $D_{50}$ (μm) | $D_{90}$ (μm) |
|---|---|---|---|---|---|
| Glass Bubble S32HS | 0.32 | 41.4 | 20 | 40 | 70 |
| Glass Bubble XLD3000 | 0.23 | 20.7 | 15 | 30 | 40 |
| Glass Bubble K25 (comparative) | 0.25 | 5.2 | 25 | 55 | 90 |
| Glass Bubble S32 (comparative) | 0.32 | 13.8 | 20 | 40 | 70 |
| Glass Bubble iMi6K (comparative) | 0.46 | 110.3 | 12 | 20 | 30 |

A. Production of Crosslinked Polymeric Composition with Ethylene/Silane Copolymer (Ex. 1)

SI-LINK™DFDA-5451 NT (ethylene/silane copolymer) pellets are fed into a Brabender mixer set to a temperature of 130° C. and a rotator speed of 10 rotations per minute (rpm), and are mixed until the ethylene/silane copolymer is in a molten form. Then, glass hollow microspheres are fed into the mixer, and the mixture is blended at a temperature of 130° C. at a rotator speed of 80 rpm for a period of four minutes to form a crosslinkable polymeric composition.

B. Production of Crosslinked Polymeric Compositions Containing Si-g-LDPE (Ex. 2, Ex. 4, Ex. 7)

AXELERON™ CX 1258 NT CPD (LDPE) pellet is fed into a Brabender mixer set to a temperature of 130° C. and a rotator speed of 10 rpm, VTMS and DTAP and are mixed with the LDPE until the LDPE is in a molten form. Then, glass hollow microspheres are fed into the mixer, and the mixture is blended at a temperature of 130° C. at a rotator speed of 80 rpm for a period of four minutes to form a crosslinkable polymeric composition.

C. Production of Comparative Sample Compositions Containing LDPE (CS 3, CS 5, CS 6, CS 8-11)

AXELERON™ CX 1258 NT CPD (LDPE) pellets are fed into a Brabender mixer set to a temperature of 130° C. and a rotator speed of 10 rpm, and are mixed until the LDPE is in a molten form. Then, glass hollow microspheres are fed into the mixer, and the mixture is blended at a temperature of 130° C. at a rotator speed of 80 rpm fora period of four minutes to form a polymeric composition.

CS 11 is formed without the glass hollow microspheres.

The compositions of CS 3, CS 5, CS 6, and CS 8-11 are not crosslinkable.

D. Plaque Preparation

Each example and comparative composition is formed into a plaque for DC testing, density testing, tensile strength testing, and tensile elongation testing.

The mold size (and resulting plaque size) is 100 mm×100 mm×1 mm. 10 gram pieces of each sample is weighed and sandwiched between two 2 mm polyethylene terephthalate (PET) films. The samples and PET films are placed into the mold. Then, the mold is sandwiched between the upper and lower plates of a hot press machine, and held at 140° C. for 10 minutes at a pressure of 0 MPa for a preheating period. After preheating, the mold is vented eight times, and then the temperature of the mold is raised to 180° C. within 5 minutes, and the pressure is raised to 10 MPa. The mold is held at a temperature of 180° C. and a pressure of 10 MPa for a period of 5 minutes. Then, the mold is cooled to 25° C. within 10 minutes at a pressure of 10 MPa. The plaque is then removed from the mold for property testing. The plaques formed from Ex. 1, Ex 2, Ex 4, and Ex 7 are crosslinked.

The composition and properties of each example and comparative composition are provided in Table 3 below.

As shown in Table 3, CS 3 and CS 5 each contains (A) ethylene-based polymer (AXELERON™ CX 1258 NT CPD) and (B) glass hollow microspheres (Glass Bubble XLD3000) having (i) a $D_{90}$ particle size of 10-100 μm (40 μm), (ii) a crush strength of 17-140 MPa (20.7 MPa), and (iii) a density of 0.10-0.40 g/cc (0.23 g/cc). CS 3 and CS 5 each lacks a silane functionalized polyolefin. CS 3 and CS 5 each exhibits a tensile strength less than 11 MPa (9.43 MPa and 9.84 MPa, respectively). Additionally, CS 5 exhibits a tensile elongation less than 12% (3.54%).

CS 8 contains (A) ethylene-based polymer (AXELERON™ CX 1258 NT CPD) and (B) glass hollow microspheres (Glass Bubble S32HS) having (i) a $D_{90}$ particle size of 10-100 μm (70 μm), (ii) a crush strength of 17-140 MPa (110.3 MPa), and (iii) a density of 0.10-0.40 g/cc (0.32 g/cc). CS 8 lacks a silane functionalized polyolefin. CS 8 exhibits a tensile strength less than 11 MPa (10.70 MPa) and a tensile elongation less than 12% (5.72%).

CS 6 and CS 9 each contains (A) ethylene-based polymer (AXELERON™ CX 1258 NT CPD) and (B) glass hollow microspheres (Glass Bubble K25 and Glass Bubble S32, respectively) having (i) a $D_9$ particle size of 10-100 μm (90 μm and 70 μm, respectively), (ii) a crush strength of less than 17 MPa (5.2 MPa and 13.8 MPa, respectively), and (iii) a density of 0.10-0.40 g/cc (0.25 g/cc and 0.32 g/cc, respectively). CS 6 and CS 9 each lacks a silane functionalized polyolefin. The glass hollow microspheres in CS 6 and CS 9 having a crush strength of less than 17 MPa broke during blending. Moreover, CS 6 and CS 9 exhibits a tensile strength less than 11 MPa (10.49 MPa and 8.28, respectively) and a dielectric constant greater than 2.06 (2.22 and 2.11, respectively). Additionally, CS 6 exhibits a density greater than 0.800 g/cc (0.910 g/cc).

CS 10 contains (A) ethylene-based polymer (AXELERON™ CX 1258 NT CPD) and (B) glass hollow microspheres (Glass Bubble iM16K) having (i) a $D_{90}$ particle size of 10-100 μm (30 μm), (ii) a crush strength of 17-140 MPa (110.3 MPa), and (iii) a density of greater than 0.40 g/cc (0.46 g/cc). CS 10 lacks a silane functionalized polyolefin. CS 10 exhibits a tensile strength less than 11 MPa (10.53 MPa), a tensile elongation less than 12% (3.39%), and a dielectric constant greater than 2.06 (2.10).

In contrast, a crosslinked composition (Ex. 1, Ex. 2, Ex. 4, Ex. 7) containing (A) silane functionalized polyolefin (SI-LINK™DFDA-5451NT or Si-g-LDPE formed by reacting the AXELERON™ CX 1258 NT CPD with VTMS in the presence of DTAP) and (B) glass hollow microspheres (Glass Bubble S32HS or Glass Bubble XLD3000) having (i) a $D_{90}$ particle size of 10-100 μm (70 μm and 40 μm, respectively), (ii) a crush strength of 17-140 MPa (41.4 MPa and 20.7 MPa, respectively), and (iii) a density of 0.10-0.40 g/cc (0.32 g/cc and 0.23 g/cc, respectively) unexpectedly exhibits the combination of (i) a tensile strength of at least 11 MPa, (ii) a tensile elongation of at least 12%, (iii) a density of less than 0.800 g/cc, and (iv) a dielectric constant of 1.8-2.06. Ex. 1, Ex. 2, Ex. 4, and Ex. 7 each demonstrates a desirable balance of mechanical properties for wire and cable applications, indicating that Ex. 1, Ex. 2, Ex. 4, and Ex. 7 each is suitable for wire and cable applications.

TABLE 3*

| | Ex 1 | Ex 2 | CS 3 | Ex 4 | CS 5 | CS 6 | Ex 7 | CS 8 | CS 9 | CS 10 | CS 11 |
|---|---|---|---|---|---|---|---|---|---|---|---|
| SI-LINK ™ DFDA-5451 NT | 91.26 | — | — | — | — | — | — | — | — | — | — |
| AXELERON ™ CX 1258 NT CPD | — | 90.90 | 91.26 | 87.63 | 88.08 | 87.18 | 83.60 | 84.16 | 84.16 | 78.70 | 100 |
| VTMS | — | 0.35 | — | 0.47 | — | — | 0.63 | — | — | — | — |
| DTAP | — | 0.05 | — | 0.04 | — | — | 0.04 | — | — | — | — |
| Glass Bubble S32HS | — | — | — | — | — | — | 15.73 | 15.84 | — | — | — |
| Glass Bubble XLD3000 | 8.74 | 8.70 | 8.74 | 11.86 | 11.92 | — | — | — | — | — | — |
| Glass Bubble K25 (comparative) | — | — | — | — | — | 12.82 | — | — | — | — | — |
| Glass Bubble S32 (comparative) | — | — | — | — | — | — | — | — | 15.84 | — | — |
| Glass Bubble iM16K (comparative) | — | — | — | — | — | — | — | — | — | 21.30 | — |
| Total (wt %) | 100 | 100 | 100 | 100 | 100 | 100 | 100 | 100 | 100 | 100 | 100 |
| Density (g/cc) | 0.769 | 0.770 | 0.748 | 0.713 | 0.722 | 0.910 | 0.727 | 0.727 | 0.792 | 0.759 | 0.922 |
| Dielectric Constant @ 1 GHz | 2.03 | 2.06 | 2.05 | 1.99 | 2.00 | 2.22 | 2.01 | 2.01 | 2.11 | 2.10 | 2.30 |
| Tensile Strength (MPa) | 11.48 | 13.67 | 9.43 | 14.17 | 9.84 | 10.49 | 14.09 | 10.70 | 8.28 | 10.53 | 10.80 |
| Tensile Elongation (%) | 36.69 | 25.33 | 32.25 | 14.90 | 3.54 | 15.33 | 22.66 | 5.72 | 28.39 | 3.39 | 500 |

*Amounts in Table 3 are in weight percent, based on the total weight of the crosslinkable composition.
CS = Comparative Sample Not wishing to be bound by any particular theory, it is believed that the silane-functionalized polyolefin crosslinks with (i.e., bonds to) the glass hollow microspheres having (i) a $D_{90}$ particle size of 10-100 μm, (ii) a crush strength of 17-140 MPa, and (iii) a density of 0.10-0.40 g/cc, which increases the stability of the glass hollow microspheres dispersed in the silane-functionalized polyolefin matrix, and unexpectedly results in a crosslinked composition with improved dielectric performance (as evidenced by a dielectric constant of less than 2.08) and improved mechanical performance (as evidenced by a tensile strength of at least 11 MPa and a tensile elongation of at least 12%), while also having a density from 0.650 g/cc to 0.800 g/cc. A dielectric constant of less than 2.08 is advantageous in wire and cable applications because a low dielectric constant indicates that the wire and cable exhibits low attenuation and sufficient transmission performance (e.g., higher transmission capacity and higher transmission rate).

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A crosslinked polymeric composition comprising:
(A) from 75 wt % to 99 wt % of a silane functionalized ethylene-based polymer;
(B) from 1 wt % to 25 wt % inorganic hollow microspheres having
   (i) a $D_{90}$ particle size from 10 μm to 100 μm;
   (ii) a crush strength from 17 MPa to 140 MPa;
   (iii) a density from 0.10 g/cc to 0.40 g/cc;
wherein the crosslinked polymeric composition comprises bonds between the silane-functionalized ethylene-based polymer and the inorganic hollow microspheres, and the crosslinked polymeric composition having
a tensile strength from 11 MPa to 40 MPa; and
a tensile elongation from 12% to 100%.

2. The crosslinked polymeric composition of claim 1, wherein the inorganic hollow microspheres are glass hollow microspheres having
(i) a $D_{90}$ particle size from 30 μm to 100 μm;
(ii) a crush strength from 17 MPa to 50 MPa; and
a density from 0.20 g/cc to 0.35 g/cc.

3. The crosslinked polymeric composition of claim 1 comprising
(A) from 80 wt % to 95 wt % silane functionalized ethylene-based polymer; and
(B) from 5 wt % to 20 wt % inorganic hollow microspheres.

4. The crosslinked polymeric composition of claim 1, wherein the crosslinked polymeric composition has a density from 0.650 g/cc to 0.800 g/cc.

5. The crosslinked polymeric composition of claim 4, wherein the crosslinked polymeric composition has a dielectric constant from 1.80 to 2.06.

6. A coated conductor comprising:
a conductor; and
a coating on the conductor, the coating comprising a crosslinked polymeric composition comprising
   (A) from 75 wt % to 99 wt % of a silane functionalized ethylene-based polymer;
   (B) from 1 wt % to 25 wt % inorganic hollow microspheres having
      (i) a $D_{90}$ particle size from 10 μm to 100 μm;
      (ii) a crush strength from 17 MPa to 140 MPa;
      (iii) a density from 0.10 g/cc to 0.40 g/cc;
wherein the crosslinked polymeric composition comprises bonds between the silane-functionalized ethylene-based polymer and the inorganic hollow microspheres, and the crosslinked polymeric composition having
a tensile strength from 11 MPa to 40 MPa; and
a tensile elongation from 12% to 100%.

7. The coated conductor of claim 6 wherein the coating directly contacts the conductor.

8. The coated conductor of claim 6, wherein the inorganic hollow microspheres are glass hollow microspheres having
(i) a $D_{90}$ particle size from 30 μm to 100 μm;
(ii) a crush strength from 17 MPa to 50 MPa; and
(iii) a density from 0.20 g/cc to 0.35 g/cc.

9. The coated conductor of claim 6, wherein the crosslinked polymeric composition comprises
(A) from 80 wt % to 95 wt % silane functionalized ethylene-based polymer; and
(B) from % 5 wt % to 20 wt % inorganic hollow microspheres.

10. The coated conductor of claim 6, wherein the crosslinked polymeric composition has a density from 0.650 g/cc to 0.800 g/cc.

11. The coated conductor of claim 6, wherein the crosslinked polymeric composition has a dielectric constant from 1.80 to 2.06.

* * * * *